(12) United States Patent
Suzuki et al.

(10) Patent No.: US 12,483,663 B2
(45) Date of Patent: Nov. 25, 2025

(54) IMAGE FORMING APPARATUS AND CONTROL METHOD OF SWITCHING FUNCTION USABLE IN IMAGE FORMING APPARATUS BASED ON CONTRACT INFORMATION OF APPARATUS MAIN BODY AND CONSUMABLE

(71) Applicant: BROTHER KOGYO KABUSHIKI KAISHA, Nagoya (JP)

(72) Inventors: Takashi Suzuki, Nagoya (JP); Noriko Misumi, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/356,144

(22) Filed: Jul. 20, 2023

(65) Prior Publication Data

US 2024/0031501 A1     Jan. 25, 2024

(30) Foreign Application Priority Data

Jul. 22, 2022   (JP) ................. 2022-117443

(51) Int. Cl.
  *H04N 1/00*  (2006.01)
  *H04N 1/32*  (2006.01)
(52) U.S. Cl.
  CPC ..... *H04N 1/00925* (2013.01); *H04N 1/00514* (2013.01); *H04N 1/32673* (2013.01)
(58) Field of Classification Search
  CPC .............. H04N 1/00925; H04N 1/32673
  See application file for complete search history.

(56) References Cited

U.S. PATENT DOCUMENTS

| 2005/0171913 A1 | 8/2005 | Kurihara et al. |
| 2005/0171915 A1 | 8/2005 | Kurihara et al. |
| (Continued) | | |

FOREIGN PATENT DOCUMENTS

| JP | 2005-159752 A | 6/2005 |
| JP | 2006251302 A | 9/2006 |
| (Continued) | | |

OTHER PUBLICATIONS

International Search Report and Written Opinion issued in counterpart application PCT/JP2023/026721, Aug. 29, 2023.

*Primary Examiner* — Nicholas Pachol
(74) *Attorney, Agent, or Firm* — Merchant & Gould P.C.

(57) ABSTRACT

An apparatus memory stores first type information indicating whether an apparatus main body is a contract apparatus or a normal apparatus. The contract apparatus is usable in a case where an apparatus contract for an image forming apparatus is set. A consumable memory stores second type information indicating whether a consumable is a contract consumable or a normal consumable. The contract consumable is usable in a case where a consumable contract for an image forming apparatus is set. A controller is configured to: determine whether the first type information indicates that the apparatus main body is the contract apparatus; determine whether the second type information indicates that the consumable attached to the apparatus main body is the contract consumable; and switch a function usable in the image forming apparatus based on a combination of the first type information and the second type information.

20 Claims, 7 Drawing Sheets

|  | CONSUMABLE CONTRACT MODE IS SET | | CONSUMABLE CONTRACT MODE IS NOT SET | |
|---|---|---|---|---|
|  | CONTRACT CARTRIDGE | NORMAL CARTRIDGE | CONTRACT CARTRIDGE | NORMAL CARTRIDGE |
| APPARATUS CONTRACT IS SET | NECESSARY | NECESSARY | UNNECESSARY | UNNECESSARY |
| APPARATUS CONTRACT IS NOT SET | NECESSARY | NECESSARY | UNNECESSARY | UNNECESSARY |

(56) References Cited

U.S. PATENT DOCUMENTS

| | | | |
|---|---|---|---|
| 2006/0204250 A1 | 9/2006 | Ishihara et al. | |
| 2013/0286428 A1* | 10/2013 | Oleinik | H04N 1/00233 |
| | | | 358/1.15 |
| 2018/0076952 A1 | 3/2018 | Kono et al. | |
| 2018/0131831 A1* | 5/2018 | Tolia | G06F 3/1229 |
| 2020/0064766 A1 | 2/2020 | Ushinohama | |
| 2021/0096793 A1* | 4/2021 | Fukusada | G06K 15/407 |
| 2022/0011986 A1* | 1/2022 | Azechi | G06F 3/1285 |
| 2022/0100436 A1* | 3/2022 | Suzuki | G06K 15/4075 |
| 2022/0171318 A1* | 6/2022 | Kaigawa | G06F 3/1229 |
| 2022/0171576 A1* | 6/2022 | Yamada | G06F 3/1285 |
| 2022/0171585 A1* | 6/2022 | Hattori | G06Q 10/10 |
| 2022/0221816 A1* | 7/2022 | Deura | G03G 15/556 |
| 2022/0232141 A1* | 7/2022 | Shimba | H04N 1/32767 |
| 2022/0334510 A1* | 10/2022 | Sugiyama | G03G 15/5079 |
| 2023/0385003 A1* | 11/2023 | Masumitsu | G06F 3/1203 |

FOREIGN PATENT DOCUMENTS

| | | | |
|---|---|---|---|
| JP | 2006267601 A | 10/2006 | |
| JP | 2018043409 A | 3/2018 | |
| JP | 2018532611 A | 11/2018 | |
| JP | 2020-31386 A | 2/2020 | |
| JP | 2021110775 A | 8/2021 | |
| JP | 2022085742 A | 6/2022 | |
| WO | 2014/120199 A1 | 8/2014 | |

* cited by examiner

FIG. 6

|  | CONSUMABLE CONTRACT MODE IS SET | | CONSUMABLE CONTRACT MODE IS NOT SET | |
|---|---|---|---|---|
|  | CONTRACT CARTRIDGE | NORMAL CARTRIDGE | CONTRACT CARTRIDGE | NORMAL CARTRIDGE |
| APPARATUS CONTRACT IS SET | NECESSARY | NECESSARY | UNNECESSARY | UNNECESSARY |
| APPARATUS CONTRACT IS NOT SET | NECESSARY | NECESSARY | UNNECESSARY | UNNECESSARY |

FIG. 7

|  | ADVANCE NOTICE CONDITION A | | |
|---|---|---|---|
|  | CONDITION A1: 100 SHEETS BEFORE THE NUMBER OF PRINTABLE SHEETS WHILE OFFLINE | CONDITION A2: THREE DAYS BEFORE PRINT STOP INSTRUCTION FROM SERVER | CONDITION A3: THREE DAYS BEFORE THE END OF CONTRACT PERIOD WITH INTERNAL CLOCK |
| APPARATUS CONTRACT IS SET | ADVANCE NOTICE 1 | ADVANCE NOTICE 3 | ADVANCE NOTICE 5 |
| APPARATUS CONTRACT IS NOT SET | ADVANCE NOTICE 2 | ADVANCE NOTICE 4 | ADVANCE NOTICE 6 |

FIG. 8

| ADVANCE NOTICE MODE | ADVANCE NOTICE CONTENT | |
|---|---|---|
| ADVANCE NOTICE 1 | APPARATUS MAY BECOME UNUSABLE | PLEASE CHECK DASHBOARD FOR DETAILS |
| ADVANCE NOTICE 2 | CONTRACT CARTRIDGE MAY BECOME UNUSABLE | |
| ADVANCE NOTICE 3 | APPARATUS MAY BECOME UNUSABLE | |
| ADVANCE NOTICE 4 | CONTRACT CARTRIDGE MAY BECOME UNUSABLE | |
| ADVANCE NOTICE 5 | APPARATUS MAY BECOME UNUSABLE | |
| ADVANCE NOTICE 6 | CONTRACT CARTRIDGE MAY BECOME UNUSABLE | |

FIG. 9

| | RESTRICTION CONDITION B | | |
|---|---|---|---|
| | CONDITION B1: THE NUMBER OF PRINTED SHEETS WHILE OFFLINE HAS REACHED THE NUMBER OF PRINTABLE SHEETS WHILE OFFLINE | CONDITION B2: PRINT STOP INSTRUCTION HAS BEEN RECEIVED FROM SERVER | CONDITION B3: THE END OF CONTRACT PERIOD HAS BEEN DETECTED WITH INTERNAL CLOCK |
| APPARATUS CONTRACT IS SET | RESTRICTION 1 (LEVEL 1) | RESTRICTION 3 (LEVEL 2) | RESTRICTION 5 (LEVEL 3) |
| APPARATUS CONTRACT IS NOT SET | RESTRICTION 2 (LEVEL 1) | RESTRICTION 4 (LEVEL 2) | RESTRICTION 6 (LEVEL 3) |
| ... | | | |
| OTHER | | | |

FIG. 10

| RESTRICTION MODE | USABLE TONER CARTRIDGE | SCANNER FUNCTION | FAX TRANSMISSION FUNCTION | FAX RECEPTION FUNCTION (PRINT) | FAX RECEPTION FUNCTION (MEMORY RECEPTION) |
|---|---|---|---|---|---|
| RESTRICTION 1 | NONE | USABLE | USABLE | NOT USABLE | NOT USABLE |
| RESTRICTION 2 | NORMAL CARTRIDGE | USABLE | USABLE | USABLE (WITH NORMAL CARTRIDGE) | USABLE |
| RESTRICTION 3 | NONE | NOT USABLE | NOT USABLE | NOT USABLE | USABLE (PANEL DISPLAY GUIDE) |
| RESTRICTION 4 | NORMAL CARTRIDGE | USABLE | USABLE | USABLE (WITH NORMAL CARTRIDGE) | USABLE |
| RESTRICTION 5 | NONE | NOT USABLE | NOT USABLE | NOT USABLE | NOT USABLE (FORCED TEL MODE) |
| RESTRICTION 6 | NORMAL CARTRIDGE | USABLE | USABLE | USABLE (WITH NORMAL CARTRIDGE) | USABLE |

IMAGE FORMING APPARATUS AND CONTROL METHOD OF SWITCHING FUNCTION USABLE IN IMAGE FORMING APPARATUS BASED ON CONTRACT INFORMATION OF APPARATUS MAIN BODY AND CONSUMABLE

REFERENCE TO RELATED APPLICATIONS

This application claims priority from Japanese Patent Application No. 2022-117443 filed on Jul. 22, 2022. The entire content of the priority application is incorporated herein by reference.

BACKGROUND ART

In recent years, a flat-rate printing service has been widely provided to users of image forming apparatuses. The flat-rate printing service is also called a subscription service. For example, in an image forming apparatus which is a contract target apparatus with which a contract for using a flat-rate printing service has been set, printing is allowed up to a preset number of sheets for a certain usage fee during a predetermined period.

DESCRIPTION

In such a subscription service, there is a contract for an image forming apparatus having multiple functions such as a print function, a scan function, a fax transmission function, and a fax reception function. There is a desire to change usable functions of the image forming apparatus, depending on whether it is a contract-dedicated apparatus that is usable when an apparatus contract for the image forming apparatus is set or a normal apparatus that is usable regardless of whether the apparatus contract is set. There is also a desire to change usable functions of the image forming apparatus, depending on whether it is a contract consumable that is usable when a consumable contract for the image forming apparatus is set or a normal consumable that is usable regardless of whether the consumable contract is set.

In view of the foregoing, an example of an object of this disclosure is to change usable functions of an image forming apparatus depending on whether a contract for the image forming apparatus and consumables is set.

According to one aspect, this specification discloses an image forming apparatus. The image forming apparatus includes an apparatus main body, an apparatus memory, a consumable, and a controller. The apparatus memory is configured to store first type information. The first type information indicates whether the apparatus main body is a contract apparatus or a normal apparatus. The contract apparatus is usable in a case where an apparatus contract for the image forming apparatus is set. The normal apparatus is usable regardless of whether the apparatus contract is set. The consumable is attached to the apparatus main body. The consumable includes a consumable memory configured to store second type information. The second type information indicates whether the consumable is a contract consumable or a normal consumable. The contract consumable is usable in a case where a consumable contract for the image forming apparatus is set. The normal consumable is usable regardless of whether the consumable contract is set. The controller determines whether the first type information indicates that the apparatus main body is the contract apparatus. The controller determines whether the second type information indicates that the consumable attached to the apparatus main body is the contract consumable. The controller switches a function usable in the image forming apparatus based on a combination of the first type information and the second type information. Thus, the function usable in the image forming apparatus is switched based on the combination of the first type information and the second type information. This specification also discloses a control method of controlling the image forming apparatus.

FIG. 6 is a diagram showing an example of a switching determination table.

FIG. 7 is a diagram showing an example of an advance notice mode setting table.

FIG. 8 is a diagram showing an example of an advance notice content setting table.

FIG. 9 is a diagram showing an example of a restriction mode setting table.

FIG. 10 is a diagram showing an example of a restriction content setting table.

EMBODIMENT 1

Hereinafter, Embodiment 1 of the present disclosure will be described with reference to FIGS. 1 to 10. In this embodiment, as an example, an image forming apparatus is a so-called multi-function printer (MFP) having multiple functions including a print function, a scanner function, and a facsimile (fax) transmission/reception function. The print function will be explained for a case where it is configured by a laser printer.

OVERVIEW OF IMAGE FORMING SYSTEM

Figure 1:
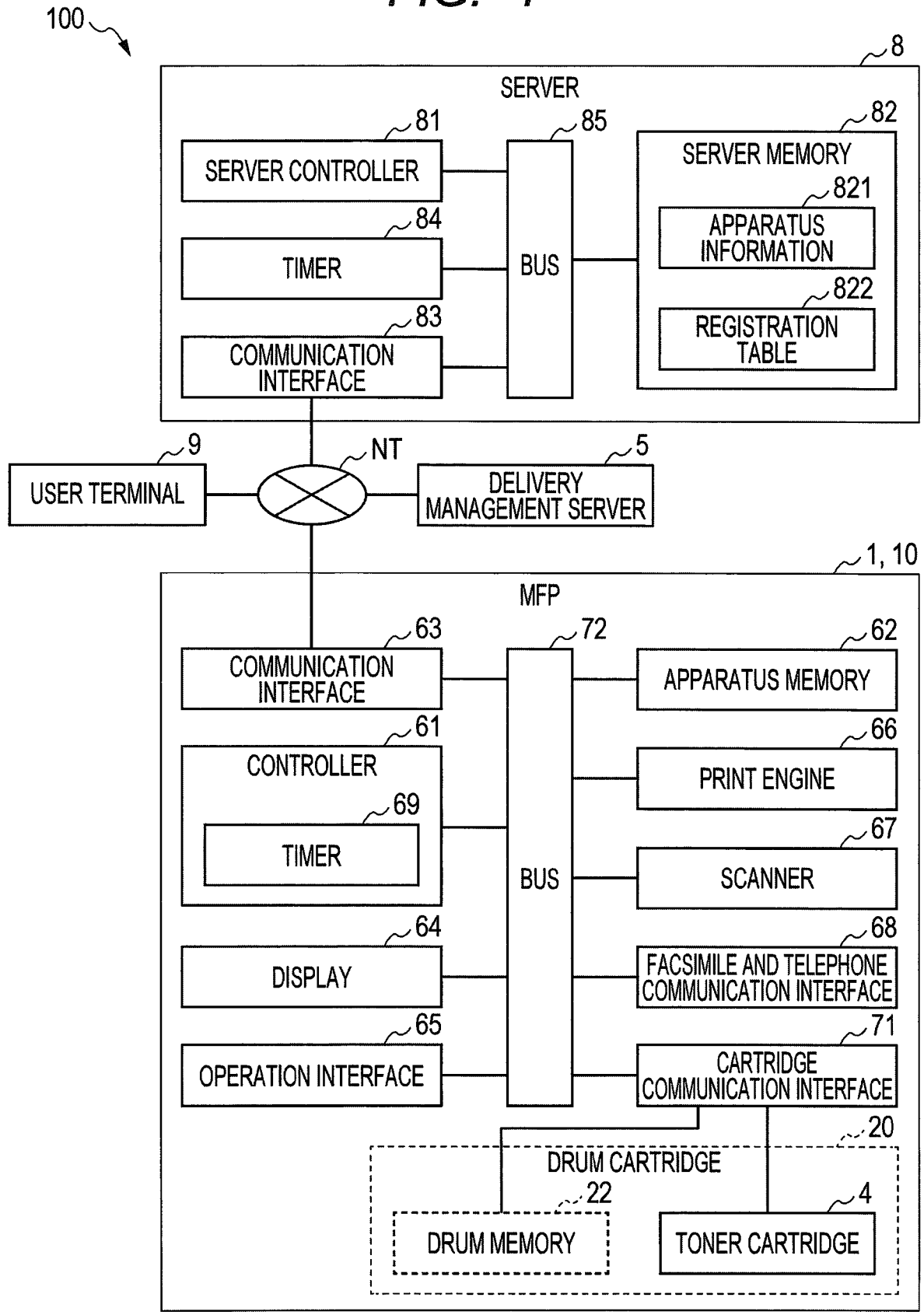
FIG. 1 is a block diagram showing an overall schematic configuration of an image forming system.

FIG. 1 is a block diagram showing an overall schematic configuration of an image forming system 100 according to the present embodiment. As shown in FIG. 1, the image forming system 100 includes an MFP 1, a server 8, a user terminal 9, and a delivery management server 5.

The MFP 1 is an apparatus for realizing services provided by setting a contract such as an "apparatus contract" or a "consumable contract" described later, with respect to the MFP 1. It can also be said that the MFP 1 is an apparatus as a target of a contract. Hereinafter, the MFP 1 as a target of a contract, which is specified by a user or provided to a user by a business operator, is also referred to as a "contract target apparatus".

For example, the user sets an "apparatus contract" which is an example of a "contract", with a business operator. With this contract, the user is provided with a service that allows the user to use a contract-dedicated apparatus main body 10 provided by the business operator, for example, for a fixed monthly fee. Thus, in a case where the user sets the "apparatus contract" with the business operator, the ownership of the MFP 1 belongs to the business operator. On the other hand, in a case where the user purchases the MFP 1 and does not set the "apparatus contract" with the business operator, the ownership of the MFP 1 belongs to the user.

For example, the user sets a "consumable contract", which is an example of a "contract", with the business operator. This allows the user to use contract consumables, for example, for a fixed monthly fee. The setting of these contracts means that the business operator providing the service and the user agree that the business operator provides the service to the user while an agreement is made regarding a service usage period, a usage fee, and so on.

In other words, in the MFP 1 of the present embodiment, after the "consumable contract" is set, the MFP 1 performs printing using contract consumables based on the content of the set contract (hereinafter also referred to as "contract printing").

In the MFP 1 of the present embodiment, after the "apparatus contract" is set, the user is allowed to use the contract-dedicated apparatus main body 10 based on the content of the set contract. In other words, after the "apparatus contract" is set, the user is allowed to use the MFP 1 for which the contract is set.

When the user sets the "apparatus contract", the user may also set the "consumable contract" at the same time. By setting the "apparatus contract" and the "consumable contract", the user is allowed to perform contract printing using contract consumables on the MFP 1 of the contract-dedicated apparatus main body 10.

DELIVERY MANAGEMENT SERVER 5

The delivery management server 5 is a server managed by a sales company. The sales company is a company that temporarily stores the MFP 1 shipped from a factory in a warehouse and provides a delivery service of delivering the MFP 1 from the warehouse in response to an order from a mass retailer and so on. The delivery management server 5 is installed at the sales company. The delivery management server 5 is an external apparatus that communicates, via the network NT, with the MFP 1 stored in the warehouse. The delivery management server 5 includes a processor such as a CPU, a storage device, and a communication interface for connecting to the network NT (not shown).

USER TERMINAL 9

The user terminal 9 used by the user is an apparatus that communicates with the server 8 to set and cancel a contract and execute other procedures. For example, an information processing terminal having a standard communication function such as a PC (Personal Computer) or a smart phone may be adopted as the user terminal 9. The user may issue a print instruction to the MFP 1 via the user terminal 9 to print an arbitrary number of sheets using contract consumable. The user terminal 9, the server 8, and the MFP 1 that constitute the image forming system 100 communicate with one another via the network NT such as the Internet.

The user terminal 9 includes an input interface for accepting various user input operations and a communication interface for communicating with the server 8. The user registers a contract target apparatus of the "consumable contract" in the server 8 by performing an input operation via the user terminal 9. For example, the user inputs, to the user terminal 9, his/her own identification information and identification information of the MFP 1 to be the contract target apparatus of the "consumable contract". In response to receiving the input, the user terminal 9 transmits the input information to the server 8.

SERVER 8

The server 8 is an external apparatus that communicates with the MFP 1 via the network NT, and is an example of a management apparatus that manages the operating state of the MFP 1. In this embodiment, the server 8 is a server managed by the business operator. As shown in FIG. 1, the server 8 includes a server controller 81, a server memory 82, a communication interface 83, and a timer 84. The server controller 81, the server memory 82, the communication interface 83, and the timer 84 are connected to one another via a bus 85. The server controller 81 is a CPU (Central Processing Unit) that performs overall control of the server 8. The server memory 82 is a storage device that stores data necessary for the server 8 to operate.

The server controller 81 updates a registration table stored in the server memory 82 in accordance with a notification or request received from the MFP 1. The "registration table" is a data table in which an apparatus ID that identifies the MFP 1 designated as the contract target apparatus, a user name, and a user ID that identifies the user are registered (stored) in association with one another, by the user or by the server 8. In other words, the registration table includes information that associates the user with the MFP 1 that is the contract target apparatus. The "registration table" is also data indicating whether a contract is currently set for each contract target apparatus.

The server memory 82 includes an area 821 and an area 822. The server memory 82 stores apparatus information in the area 821. The server memory 82 stores the registration table in the area 822. The areas 821 and 822 are rewritable areas. The apparatus information is data in which various types of information about the MFP 1 are collected. The apparatus information is stored separately for each MFP 1. The apparatus information includes at least an apparatus ID that identifies the MFP 1. Further, the apparatus information may include a cumulative number of printed sheets printed by the MFP 1 and a cumulative number of printed sheets printed by the MFP 1 under contract printing.

The communication interface 83 is a wired or wireless interface for communicating with the user terminal 9, the delivery management server 5, and the MFP 1, and is connected to the network NT. The server controller 81 receives various data, notifications, and requests from the MFP 1 via the communication interface 83. The server controller 81 transmits various data, notifications, and requests to the MFP 1 via the communication interface 83.

For example, the server controller 81 receives the apparatus ID, the cumulative number of printed sheets, and the cumulative number of printed sheets printed under contract printing from the MFP 1 via the communication interface 83. Then, the server controller 81 may associate the received apparatus ID with each cumulative number of sheets and store the same in the area 821 of the server memory 82 as the apparatus information of the MFP 1.

MFP 1

As shown in FIG. 1, the MFP 1 includes a controller 61, an apparatus memory 62, a communication interface 63, a display 64, an operation interface 65, a print engine 66, and a scanner 67, a facsimile and telephone communication interface 68, and a cartridge communication interface 71. The controller 61, the apparatus memory 62, the communication interface 63, the display 64, the operation interface 65, the print engine 66, the scanner 67, the facsimile and telephone communication interface 68, and the cartridge communication interface 71 are connected to each other via a bus 72.

In the MFP 1, in a state where the toner cartridge 4 is attached to the drum cartridge 20, the toner cartridge 4 is detachably attached to the apparatus main body 10 together with the drum cartridge 20. The drum cartridge 20 includes a photosensitive drum (not shown) as a component used for image formation. The drum cartridge 20 may include a drum memory 22. The drum memory 22 is a memory from which information is read and to which information is written. The drum memory 22 is, for example, a flash ROM (Read Only Memory) or an EEPROM (Electronically Erasable and Programmable Read Only Memory).

The drum memory 22 may store information regarding the photosensitive drum of the drum cartridge 20. The drum memory 22 may store a drum ID. The drum memory 22 may store drum life information. The drum ID is a unique serial number for identifying each drum cartridge 20. The drum life information is information representing the life of the photosensitive drum.

Figure 2:
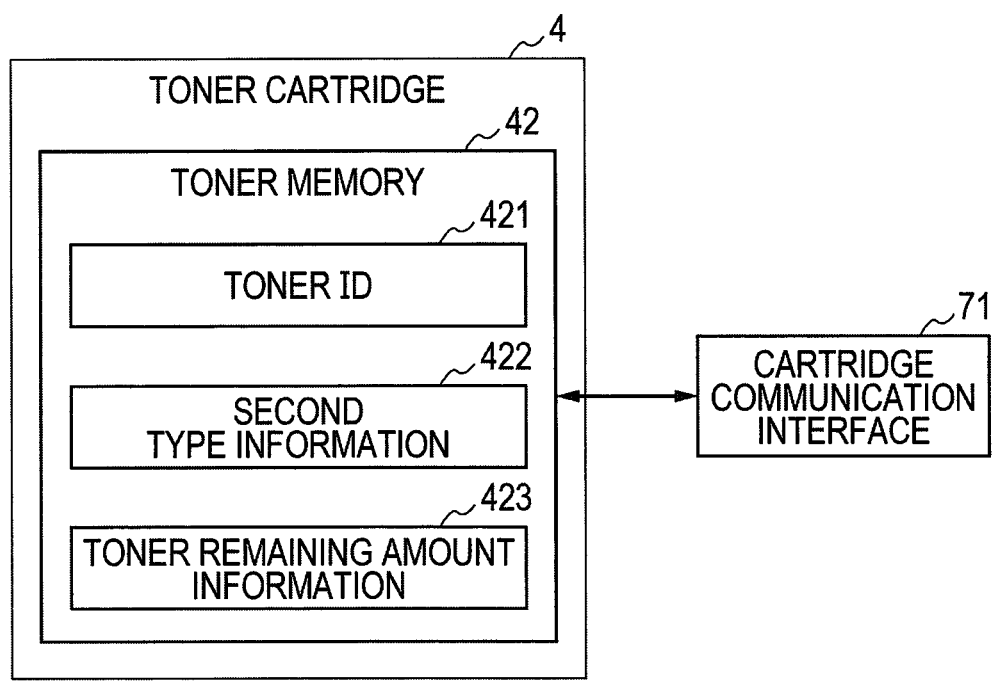
FIG. 2 is a block diagram illustrating an example of information stored in a toner memory of a toner cartridge.

As shown in FIG. 2, the toner cartridge 4 includes a toner memory 42 as an example of a consumable memory. The toner memory 42 is arranged on an outer surface of the toner cartridge 4. The toner memory 42 is a memory from which information is read and to which information is written, such as a flash ROM or an EEPROM.

The toner memory 42 includes a first area 421, a second area 422 and a third area 423 for storing information about the toner cartridge 4. The toner memory 42 stores a toner ID in the first area 421. The toner memory 42 stores second type information in the second area 422. The toner memory 42 stores toner remaining amount information in the third area 423. The third area 423 may be rewritable with data.

The toner ID is, for example, a unique serial number for identifying each toner cartridge 4. The toner ID may include information representing the color of each toner cartridge 4.

The second type information is information representing the type of the toner cartridge 4. In this embodiment, there are two types of toner cartridges 4. One is a "contract cartridge (contract-dedicated cartridge)" as an example of a contract consumable (contract-dedicated consumable) that is usable only in a contract target apparatus. The other is a "normal cartridge" as an example of a normal consumable that is usable even in the MFP 1 that is not a contract target apparatus. The second type information may be included in the toner ID. That is, the toner ID may be information for identifying each toner cartridge 4 and information indicating the type of each toner cartridge 4.

The toner remaining amount information is information representing the amount of toner remaining in the toner cartridge 4. For example, the toner remaining amount is composed of values corresponding to a plurality of stages from full to empty, and the value corresponding to the toner remaining amount among the plurality of stages from full to empty is stored in the third area 423. Each stage of the toner remaining amount stored in the toner memory 42 may be a character string such as "FULL" to "EMPTY" or a numerical value such as "100%" to "0%" or information combining the character string and the numerical value based on the values described above.

The cartridge communication interface 71 is, for example, a terminal. The cartridge communication interface 71 is electrically connected to each of the drum memory 22 of the drum cartridge 20 attached to the apparatus main body 10 and the toner memory 42 of the toner cartridge 4 attached to the apparatus main body 10 together with the drum cartridge 20.

The controller 61 includes, for example, an ASIC (Application Specific Integrated Circuit). The controller 61 also includes a timer 69 and is configured to measure time. The controller 61 enables the use of a plurality of functions including a print function, a scanner function, and a fax transmission/reception function of the MFP 1 by executing various processes.

The controller 61 may include a processor such as a CPU. In this case, the apparatus memory 62 may store a control program that realizes a plurality of functions including a print function, a scanner function, and a fax transmission/reception function. The processor of the controller 61 may operate according to the control program stored in the apparatus memory 62, thereby realizing the use of a plurality of functions including the print function, the scanner function, and the fax transmission/reception function in the MFP 1.

The controller 61 itself may include a computer-readable recording medium (storage medium) storing the control program. As the recording medium, a "non-temporary tangible medium" such as a ROM (Read Only Memory), a tape, a disk, a card, a semiconductor memory, a programmable logic circuit, and so on may be used. Further, a RAM (random access memory) for expanding the control program may be used.

The control program may be supplied to a computer via any transmission medium (communication network, broadcast wave, and so on) capable of transmitting the control program. One aspect of the present disclosure may also be realized in the form of a data signal embedded in a carrier wave in which the control program is embodied by electronic transmission.

When the drum cartridge 20 and the toner cartridge 4 are attached to the apparatus main body 10, the drum memory 22 and the toner memory 42 are electrically connected to the controller 61 via the cartridge communication interface 71. The controller 61 reads information from the drum memory 22 and the toner memory 42 via the cartridge communication interface 71. The controller 61 executes at least writing processing or rewriting processing of information to the drum memory 22 and the toner memory 42 via the cartridge communication interface 71.

Figure 3:
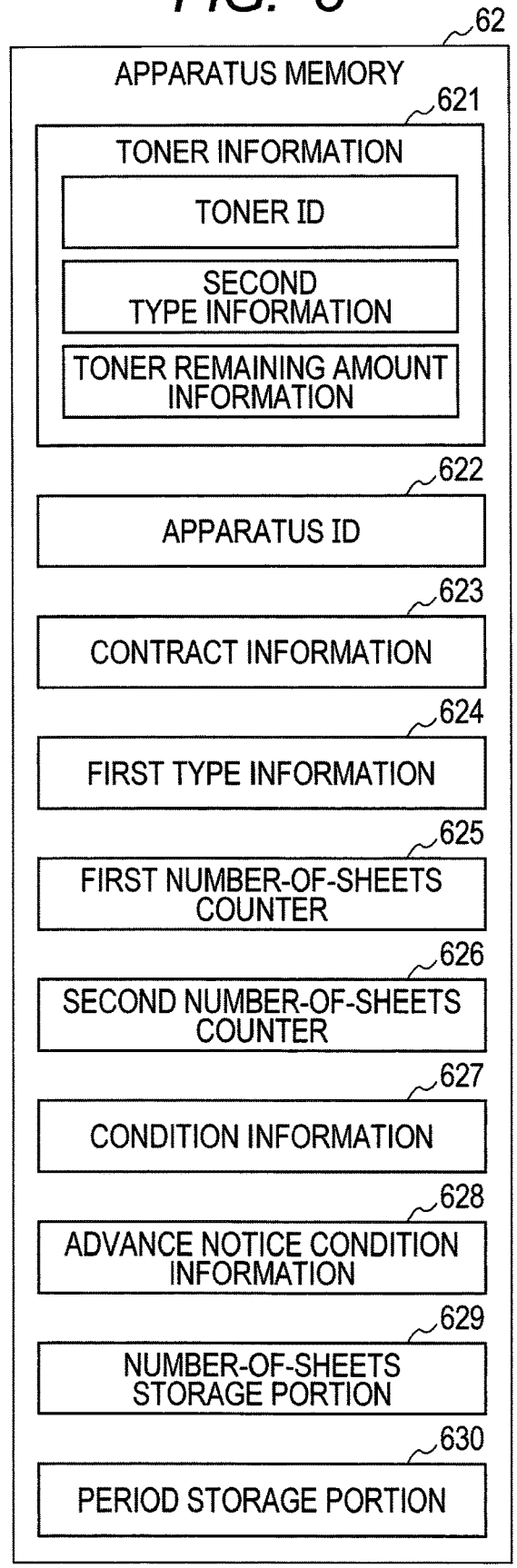
FIG. 3 is a block diagram illustrating an example of information stored in an apparatus memory.

The apparatus memory 62 is a memory from which information is read and to which information is written. The apparatus memory 62 is, for example, a flash ROM or an EEPROM. As shown in FIG. 3, the apparatus memory 62 includes areas 621 to 628 for storing various information. The apparatus memory 62 stores toner information in the area 621.

The toner information is information about each toner cartridge 4 attached to the MFP 1. For example, the toner information may be data in which a toner ID read from a certain toner memory 42 is associated with the second type information and toner remaining amount information read from the same toner memory 42. The apparatus memory 62 may store the data associated in this way for each toner cartridge 4 in the area 621.

The apparatus memory 62 stores an apparatus ID in the area 622. The apparatus ID is identification information for identifying the MFP 1. The apparatus ID may be the serial number of the MFP 1, for example.

The apparatus memory 62 stores contract information in the area 623. The contract information indicates one of two types of modes, "contract mode" and "normal mode." The "contract mode (consumable contract mode)" indicates a state where a "consumable contract" for the MFP 1 is set. The "normal mode" indicates a state where a consumable contract for the MFP 1 has not been set, or the "consumable contract" has been canceled. When the MFP 1 is shipped from the factory, the area 623 stores a value corresponding to "normal mode" as an initial value. The controller 61 appropriately rewrites the "contract information".

The apparatus memory 62 stores first type information in the area 624. The first type information is information representing the type of the MFP 1. In the present embodiment, there are two types of MFPs 1. One is a "contract (contract-dedicated) apparatus" that is usable when an "apparatus contract" is set. The other is a "normal apparatus" for which the "apparatus contract" is not set, or which is usable regardless of whether the "apparatus contract" is set.

The controller 61 appropriately rewrites the first type information. When the MFP 1 is shipped from the factory, the area 624 stores a value corresponding to "normal apparatus" as an initial value. The first type information may be included in the apparatus ID. That is, the apparatus ID may be information identifying each MFP 1 and information indicating the type of each MFP 1.

The apparatus memory 62 stores a first number-of-sheets counter in the area 625. The first number-of-sheets counter is the total number of printed sheets in the MFP 1. The apparatus memory 62 stores a second number-of-sheets counter in the area 626. The second number-of-sheets counter indicates the number of printed sheets printed by the MFP 1 under contract printing. The second number-of-sheets counter may be reset to 0 each time the MFP 1 shifts from the contract mode to the normal mode, or may be the total number of printed sheets in the MFP 1 under contract printing so far. Hereinafter, unless otherwise specified, the value of the second number-of-sheets counter is the total number of printed sheets printed under contract printing.

The apparatus memory 62 stores condition information in the area 627. The condition information includes a plurality of "restriction conditions B" set in advance to restrict the use of a plurality of functions of the MFP 1 (see FIG. 9). The apparatus memory 62 stores, in the area 627, a restriction mode setting table 95 (see FIG. 9) described later.

The restriction mode setting table 95 stores "restriction modes" for restricting the use of the plurality of functions of the MFP 1. The restriction modes are associated with a combination of a plurality of restriction conditions B and the presence or absence of the apparatus contract for the MFP 1. The "restriction modes" include restriction modes of "Restriction 1," "Restriction 2," "Restriction 3," "Restriction 4," "Restriction 5," and "Restriction 6." Each restriction mode is labeled with "Level 1", "Level 2" or "Level 3" indicating a selection order for selecting one "restriction mode" from two or more "restriction modes" corresponding to the satisfied restriction conditions B when two or more restriction conditions B are satisfied at the same time. The selection order for selecting the "restriction mode" is higher in the order of "level 3", "level 2", and "level 1". That is, "level 3" is the highest level, and "level 1" is the lowest level.

The apparatus memory 62 stores, in the area 627, a restriction content setting table 96 (see FIG. 10) described later. The restriction content setting table 96 stores restriction contents of the plurality of functions of the MFP 1 for each restriction mode.

The apparatus memory 62 stores advance notice condition information in the area 628. The advance notice condition information includes a plurality of preset "advance notice conditions A" (see FIG. 7). The plurality of "advance notice conditions A" are conditions for displaying an advance notice on the display 64 that functions that is usable by the MFP 1 may be restricted for each of the plurality of restriction modes. The apparatus memory 62 stores, in the area 628, an advance notice mode setting table 92 (see FIG. 7) described later.

The advance notice mode setting table 92 stores "advance notice mode" that gives an advance notice to the effect that the functions that is usable by the MFP 1 may be restricted. The "advance notice mode" is associated with a combination of a plurality of advance notice conditions A and the presence or absence of the apparatus contract for the MFP 1. The "advance notice modes" include advance notice modes of "Advance notice 1", "Advance notice 2", "Advance notice 3", "Advance notice 4", "Advance notice 5", and "Advance notice 6". The apparatus memory 62 stores, in the area 628, an advance notice content setting table 93 (see FIG. 8) described later. The advance notice content setting table 93 stores advance notice content for each advance notice mode.

The apparatus memory 62 also includes a number-of-sheets storage portion 629. The number-of-sheets storage portion 629 stores the number of sheets that is printable by contract printing while the MFP 1 continues to be offline to the network NT. The apparatus memory 62 also includes a period storage portion 630. The period storage portion 630 stores contract period information including information of contract start date and time and contract end date and time for each of the "consumable contract" and the "apparatus contract".

The communication interface 63 is a wired or wireless interface for communicating with the user terminal 9, the server 8, and the delivery management server 5, and is connected to the network NT. The communication interface 63 is also connected to a telephone network. The controller 61 receives various data, notifications, and requests from the server 8, the delivery management server 5, and so on, via the communication interface 63. The controller 61 transmits various data, notifications, and requests to the server 8 via the communication interface 63.

The display 64 is, for example, a liquid crystal display. The operation interface 65 is a device that receives an operation by a user. The user inputs various instructions to the MFP 1 by operating the operation interface 65. The operation interface 65 may be a touch panel integrally arranged on the screen of the display 64.

The print engine 66 takes out a sheet in a sheet feed tray and conveys the sheet by means of a conveyance mechanism (not shown). The print engine 66 prints an image on the conveyed sheet by a laser printer method using the drum cartridge 20 and the toner cartridge 4. Thus, the MFP 1 has a print function that uses the print engine 66. The toner cartridges 4 include cyan, magenta, yellow, and black toner cartridges 4. However, hereinafter, unless otherwise specified, they will be simply referred to as "toner cartridge 4" without distinguishing between them.

The scanner 67 optically reads a document, which is an object to be read, using photoelectric conversion elements such as CCD and CMOS. After that, the MFP 1 generates scan data representing the image read by the scanner 67. Thus, the MFP 1 has a scanner function that uses the scanner 67.

The facsimile and telephone communication interface 68 is connected to the telephone network via the communication interface 63. The facsimile and telephone communication interface 68 performs transmission and reception of image data as a facsimile signal with an external communication destination apparatus, and performs voice communication with a desired destination. Thus, the MFP 1 has a facsimile (fax) transmission function and a facsimile reception function.

CONTRACT STATUS UPDATE PROCESS

Figure 4:
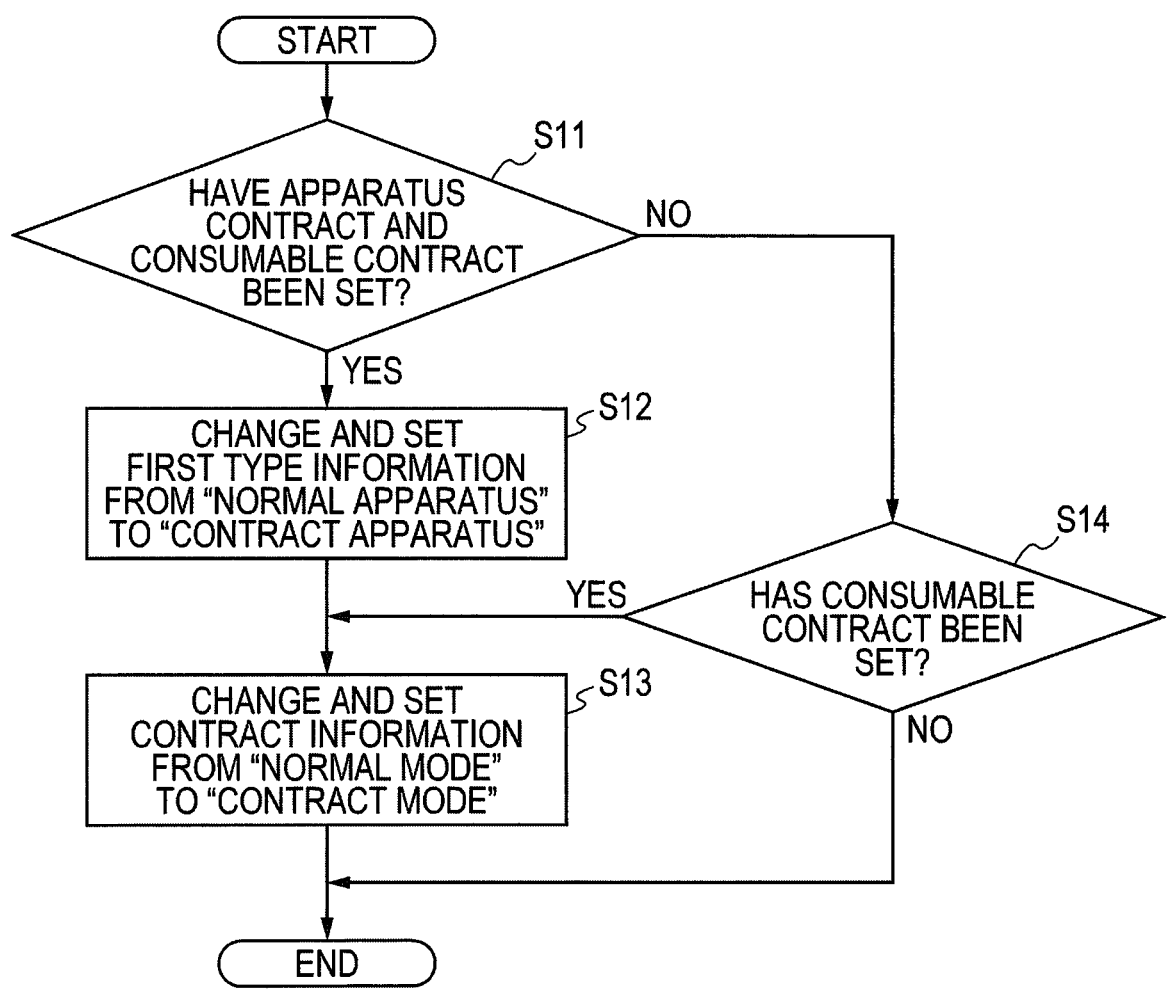
FIG. 4 is a flowchart showing an example of a contract status update process executed by an MFP.

Next, an example of a contract status update process executed by the controller 61 of the MFP 1 in the sales company's warehouse and so on will be described with reference to FIG. 4. FIG. 4 shows an example of the contract status update process executed by the controller 61 of the MFP 1. The program shown in the flowchart of FIG. 4 is stored in the apparatus memory 62 in advance.

When the MFP 1 is shipped from the factory and stored in the warehouse of the sales company, and so on, the contract information stored in the area 623 of the apparatus memory 62 is set to indicate "normal mode." Further, the contract information stored in the area 623 of the apparatus memory 62 is set to indicate "normal apparatus". That is, at the time when the MFP 1 is shipped from the factory and delivered to the sales company's warehouse and so on, the contract information of the MFP 1 indicates "normal mode" and "normal apparatus".

A contract status update process described below is a process executed in the warehouse and so on after the MFP 1 is delivered to the warehouse and so on of the sales company. The contract status update process is also a process that is executed when the MFP 1 is delivered from the warehouse and so on to a user.

The controller 61 displays a standby screen on the display 64 when the power is turned on. When the controller 61 is instructed to execute the contract status update process via the operation interface 65 on the standby screen, the controller 61 starts the program of the contract status update process shown in the flowchart of FIG. 4 and proceeds to the processing of S11.

As shown in FIG. 4, the controller 61 of the MFP 1 first determines whether an instruction indicating that the "apparatus contract" and "consumable contract" have been set has been input via the operation interface 65 (S11). In response to determining that an instruction indicating that the "apparatus contract" and "consumable contract" have been set has been input via the operation interface 65 (S11: YES), the controller 61 proceeds to the processing of S12.

In S12, the controller 61 reads the first type information stored in the area 624 of the apparatus memory 62. Then, the controller 61 changes the setting of the first type information from "normal apparatus" to "contract apparatus", and then stores the first type information in the area 624 again (S12).

In S13, the controller 61 reads the contract information stored in the area 623 of the apparatus memory 62. Then, the controller 61 changes the setting of the contract information from "normal mode" to "contract mode", and then stores the contract information in the area 623 again (S13). After that, the controller 61 ends the contract status update process.

Thus, the MFP 1 stored in the sales company's warehouse and so on is set as a product that is delivered to the user who has set the "apparatus contract" and "consumable contract". Thus, at the time when all the MFPs 1 are shipped from the factory, the first type information is set to indicate "normal apparatus". Further, the contract information is set to indicate "normal mode." This enables standardization of the products of the MFP 1 shipped from the factory.

Further, because the first type information is set to indicate "contract apparatus", the ownership of the MFP 1 is set to belong to the business operator. Further, the contract information is set to indicate "contract mode". Thus, the MFP 1 is set to perform contract printing using the toner cartridge 4 that is a contract cartridge.

The contract status update process may be executed by the controller 61 before the MFP 1 is shipped from the factory. Then, in response to determining that an instruction indicating that the "apparatus contract" and the "consumable contract" have been set has been input via the operation interface 65 (S11: YES), the controller 61 may execute the processing of S12 and S13. In other words, after setting the MFP 1 as the MFP 1 deliverable to a user who has set the "apparatus contract" and the "consumable contract", the MFP 1 may be shipped to the sales company.

In S11, in response to determining that an instruction indicating that the "apparatus contract" and "consumable contract" have been set is not input via the operation interface 65 (S11: NO), the controller 61 proceeds to the processing of S14. In S14, the controller 61 determines whether an instruction indicating that the "consumable contract" has been set has been input via the operation interface 65 (S14).

In response to determining that an instruction indicating that the "consumable contract" has been set has been input via the operation interface 65 (S14: YES), the controller 61 proceeds to the processing of S13. After executing the processing of S13, the controller 61 ends the contract status update process.

Thus, the MFP 1 stored in the sales company's warehouse and so on is set as a product that is deliverable to the user who has set the "consumable contract". Thus, at the time when all the MFPs 1 are shipped from the factory, the first type information is set to indicate "normal apparatus", and the contract information is set to indicate "normal mode", which enables standardization of the products of the MFP 1 to be shipped from the factory. Further, since the first type information is set to indicate "normal apparatus", the ownership of the MFP 1 belongs to the user who purchased this MFP 1. Further, since the contract information is set to indicate "contract mode", the MFP 1 is set to perform contract printing using the toner cartridge 4 that is a contract cartridge.

The contract status update process may be executed by the controller 61 before the MFP 1 is shipped from the factory. In response to determining that an instruction indicating that the "consumable contract" has been set has been input via the operation interface 65 (S14: YES), the controller 61 may execute the processing of S13. In other words, after setting the MFP 1 as the MFP 1 deliverable to a user who has set the "consumable contract", the MFP 1 may be shipped to the sales company.

In response to determining in S14 that an instruction indicating that the "consumable contract" has been set is not input via the operation interface 65 (S14: NO), the controller 61 determines not to change the contract information stored in the apparatus memory 62. In other words, the MFP 1 becomes an uncontracted MFP 1 that has not set a contract with a user. After that, the controller 61 ends the contract status update process.

By the contract status updating process described above, the MFP 1 stored in the warehouse of the sales company and so on is set as a product that is deliverable to a user in a state shipped from the factory, which enables standardization of the products of the MFP 1 shipped from the factory. The ownership of the MFP 1 belongs to the user who purchased this MFP 1. The MFP 1 is not allowed to perform contract printing using the toner cartridge 4 that is a contract cartridge.

SWITCHING PROCESS

Figure 5:
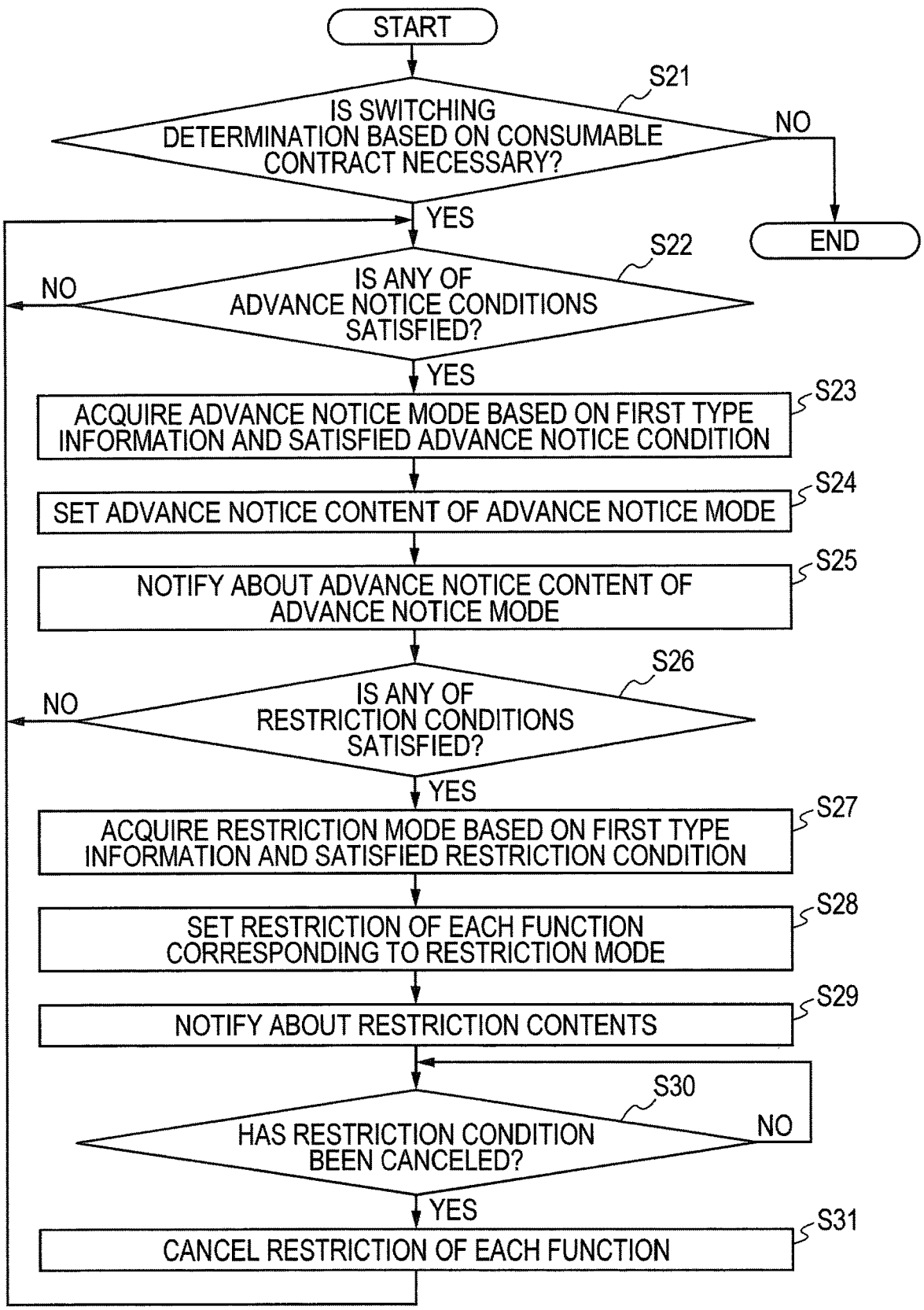
FIG. 5 is a flowchart showing an example of a switching process of switching a plurality of functions that is usable by the MFP and executed by the MFP.

Next, in the MFP 1 configured as described above, an example of a switching process for switching a plurality of functions that is usable in the MFP 1 executed by the controller 61 will be described with reference to FIGS. 5 to 10. FIG. 5 is a flowchart showing an example of the switching process for switching the plurality of functions that is usable in the MFP 1 executed by the controller 61 of the MFP 1. The program shown in the flowchart of FIG. 5 is stored in the apparatus memory 62 in advance. When the power is turned on, the controller 61 starts the program of the switching process shown in the flowchart of FIG. 5 every several minutes to several hours, and proceeds to the processing of step S21.

The controller 61 may start the program of the switching process and proceed to the processing of S21, not only when the power is turned on, but also when an execution instruction for the switching process has been received from the outside via the communication interface 63. Also, the controller 61 may start the program of the switching process and proceed to the processing of S21, not only when the power is turned on, but also at regular intervals, for example, at intervals of several hundred milliseconds.

A switching determination table 91 shown in FIG. 6 is preliminarily stored in the apparatus memory 62. The advance notice mode setting table 92 shown in FIG. 7, the advance notice content setting table 93 shown in FIG. 8, the restriction mode setting table 95 shown in FIG. 9, and the restriction content setting table 96 shown in FIG. 10 are preliminarily stored in the apparatus memory 62.

As shown in FIG. 5, the controller 61 of the MFP 1 first determines whether switching determination based on consumable contract is necessary based on the switching determination table 91 shown in FIG. 6 (S21). As shown in FIG. 6, the switching determination table 91 stores information including "apparatus contract is set", "apparatus contract is not set", "consumable contract mode is set", and "consumable contract mode is not set".

The "apparatus contract is set" indicates that "apparatus contract" is set. The "apparatus contract is not set" indicates that "apparatus contract" is not set. The "consumable contract mode is set" indicates that "consumable contract" is set. The "consumable contract mode is not set" indicates that "consumable contract" is not set. Each of the "consumable contract mode is set" and the "consumable contract mode is not set" includes information indicating the type of the attached toner cartridge 4, that is, "contract cartridge" and "normal cartridge".

For example, if the combination of "apparatus contract is set" and "consumable contract mode is set" applies, the controller 61 determines that switching determination in S21 is necessary regardless of whether the type of the toner cartridge 4 is "contract cartridge" or "normal cartridge". If the combination of "apparatus contract is not set" and "consumable contract mode is set" applies, the controller 61 determines that switching determination in S21 is necessary regardless of whether the type of the toner cartridge 4 is "contract cartridge" or "normal cartridge".

If the combination of "apparatus contract is set" and "consumable contract mode is not set" applies, the controller 61 determines that switching determination in S21 is not necessary regardless of whether the type of the toner cartridge 4 is "contract cartridge" or "normal cartridge". If the combination of "apparatus contract is not set" and "consumable contract mode is not set" applies, the controller 61 determines that switching determination in S21 is not necessary regardless of whether the type of the toner cartridge 4 is "contract cartridge" or "normal cartridge".

In other words, in a case of the "consumable contract mode is set", that is, when the "consumable contract" is set, the controller 61 determines that the switching determination in S21 is necessary. In a case of the "consumable contract mode is not set", that is, when the "consumable contract" is not set, the controller 61 determines that the switching determination in S21 is not necessary.

Thus, in S21, the controller 61 first reads the first type information from the area 624 of the apparatus memory 62. Then, the controller 61 determines whether the first type information indicates "contract apparatus" (first determination process). In a case where the first type information indicates "contract apparatus", the controller 61 determines that the "apparatus contract is set" of the switching determination table 91 applies. In a case where the first type information indicates "normal apparatus", the controller 61 determines that the "apparatus contract is not set" of the switching determination table 91 applies.

After the first determination process, the controller 61 reads the "second type information" of the toner information from the area 621 of the apparatus memory 62. Then, the controller 61 determines whether the second type information indicates "contract cartridge" (second determination process). In a case where the second type information indicates "contract cartridge", the controller 61 determines that the "contract cartridge" of the switching determination table 91 applies. In a case where the second type information indicates "normal cartridge", the controller 61 determines that the "normal cartridge" of the switching determination table 91 applies. Note that the order of determination of the first determination process and the second determination process by the controller 61 is not limited to this. That is, the controller 61 may execute the first determination process after executing the second determination process.

The controller 61 also reads the contract information from the area 623 of the apparatus memory 62. Then, the controller 61 determines whether the contract information indicates "contract mode". In a case where the contract information indicates "normal mode", that is, the consumable contract for the MFP 1 is not set, the controller 61 determines that the "consumable contract mode is not set" of the switching determination table 91 applies. In a case where the "consumable contract mode is not set" of the switching determination table 91 applies, the controller 61 determines that switching determination is not necessary regardless of whether the type of the toner cartridge 4 is "contract cartridge" or "normal cartridge" (S21: NO). In this way, the controller 61 determines whether the switching determination is necessary based on the first type information, the second type information, and the contract information. After that, the controller 61 ends the switching process.

In a case where the contract information indicates "contract mode", that is, the consumable contract for the MFP 1 is set, the controller 61 determines that the "consumable contract mode is set" of the switching determination table 91 applies. In a case where the "consumable contract mode is set" of the switching determination table 91 applies, the controller 61 determines that switching determination is necessary regardless of whether the type of the toner cartridge 4 is "contract cartridge" or "normal cartridge" (S21: YES). Then, the controller 61 proceeds to the processing of S22.

In S22, the controller 61 determines whether any of advance notice conditions A of the advance notice mode setting table 92 shown in FIG. 7 is satisfied (S22). As shown in FIG. 7, the advance notice mode setting table 92 stores information including "apparatus contract is set", "apparatus contract is not set", and "advance notice condition A".

The "advance notice condition A" includes information representing "Condition A1", "Condition A2", and "Condition A3".

The condition A1, the condition A2, and the condition A3 are as follows.

Condition A1: 100 sheets before the number of printable sheets while offline

Condition A2: three days before print stop instruction from server

Condition A3: three days before the end of contract period with the internal clock Each condition will be described in more details.

Condition A1 is a case where the number of printed sheets printed by contract printing while offline in which communication with an external communication apparatus, for example, the server 8 via the communication interface 63 has reached 100 sheets before the number of printable sheets while offline, for example. Specifically, the controller 61 reads the number of printable sheets while offline from the number-of-sheets storage portion 629 of the apparatus memory 62. Then, the controller 61 reads a count value of the second number-of-sheets counter that is stored in the area 626 of the apparatus memory 62 from the time point when the offline is detected, and determines whether the condition A1 is satisfied.

Condition A2 is a case where, for example, three days before a print stop instruction is received from the server 8 via the communication interface 63. For example, the controller 61 receives the print stop instruction from the server 8 via the communication interface 63 when the user has not paid the usage fee even after the payment deadline for the usage fee of the apparatus contract or consumable contract has passed. Here, the payment deadline for the usage fee of the apparatus contract or the consumable contract is stored in the apparatus memory 62 at the time of the contract. The controller 61 reads date and time information by the timer 69 which is the internal clock. Then, the controller 61 reads the payment deadline for the usage fee of the apparatus contract or the consumable contract from the apparatus memory 62, and determines whether the condition A2 is satisfied.

Condition A3 is a case where the timer 69 as the internal clock has reached, for example, three days before the end of the contract period of the "apparatus contract" or "consumable contract". The controller 61 reads the contract end date and time information of each of the "apparatus contract" and the "consumable contract" from the period storage portion 630 of the apparatus memory 62, and determines whether the condition A3 is satisfied.

In response to determining that none of the advance notice conditions A of the advance notice mode setting table 92 is satisfied (S22: NO), the controller 61 executes the processing of S22 again. In response to determining that any of the advance notice conditions A of the advance notice mode setting table 92 is satisfied (S22: YES), the controller 61 proceeds to the processing of S23.

In S23, the controller 61 acquires an advance notice mode based on the first type information and the advance notice condition satisfied in S22. Specifically, controller 61 first reads the first type information from the area 624 of the apparatus memory 62. Then, in a case where the first type information indicates the "contract apparatus", the controller 61 determines that the "apparatus contract" has been set. Then, the controller 61 reads the advance notice mode based on a combination with any one of the conditions A1, A2, and A3 satisfied in S22, and stores the advance notice mode in the apparatus memory 62 (S23). For example, if the combination of "apparatus contract is set" and "condition A1" applies, the controller 61 reads the advance notice mode of "Advance notice 1" in S23.

In a case where the first type information indicates the "normal apparatus", the controller 61 determines that the "apparatus contract" is not set. Then, the controller 61 reads the advance notice mode based on a combination with any one of the conditions A1, A2, and A3 satisfied in S23, and stores the advance notice mode in the apparatus memory 62 (S23). For example, in a case where the combination of "apparatus contract is not set" and "condition A1" applies, the controller reads the advance notice mode of "Advance notice 2" in S22.

Here, advance notice 1, advance notice 2, advance notice 3, advance notice 4, advance notice 5, and advance notice 6 shown in FIG. 7 will be described in detail with reference to FIG. 8. FIG. 8 shows an example of the advance notice content setting table 93. As shown in FIG. 8, the advance notice content setting table 93 includes information of "advance notice mode" and "advance notice content". The "advance notice mode" includes information representing advance notice modes of advance notice 1, advance notice 2, advance notice 3, advance notice 4, advance notice 5, and advance notice 6. The "advance notice content" includes information of the advance notice content corresponding to each of the advance notice modes of advance notice 1, advance notice 2, advance notice 3, advance notice 4, advance notice 5, and advance notice 6.

The information of the advance notice content corresponding to each of the advance notice modes of advance notice 1, advance notice 2, advance notice 3, advance notice 4, advance notice 5, and advance notice 6 is as follows.

Advance notice 1, Advance notice 3, and Advance notice 5: The apparatus may become unusable. Please check your dashboard for details.

Advance notice 2, Advance notice 4, and Advance notice 6: Contract cartridges may become unusable. Please check your dashboard for details.

Here, the "dashboard" is a web page for dealing with individual users.

In S24, the controller 61 reads the advance notice mode stored in S23 from the apparatus memory 62. Then, the controller 61 reads the "advance notice content" corresponding to this advance notice mode from the advance notice content setting table 93 shown in FIG. 8 and stores the advance notice content in the apparatus memory 62 (S24).

For example, in a case where the advance notice mode read from the apparatus memory 62 is "advance notice 1", the controller 61 reads "The apparatus may become unusable. Please check your dashboard for details." Then, the controller 61 stores the content of the read advance notice in the apparatus memory 62. In a case where the advance notice mode read from the apparatus memory 62 is "advance notice 2", the controller 61 reads from the advance notice content setting table 93 "Contract cartridges may become unusable. Please check your dashboard for details." corresponding to the advance notice 2. Then, the controller 61 stores the content of the read advance notice in the apparatus memory 62.

In S25, the controller 61 reads the content of the advance notice stored in the apparatus memory 62 in S24, displays the content on the display 64, notifies the user about the content of the advance notice (S25), and then proceeds to the processing of S26.

In S26, the controller 61 determines whether any of restriction conditions B of the restriction mode setting table 95 shown in FIG. 9 is satisfied (S26). As shown in FIG. 9, the restriction mode setting table 95 stores information including "apparatus contract is set", "apparatus contract is not set", and so on, and "restriction condition B".

The "restriction condition B" includes information representing "condition B1", "condition B2", and "condition B3". The conditions B1, B2, and B3 are as follows.

Condition B1: The number of printed sheets while offline has reached the number of printable sheets while offline Condition B2: Print stop instruction has been received from server Condition B3: The end of contract period has been detected with internal clock Each condition will be described below in more detail.

Condition B1 is a case where the number of printed sheets printed by contract printing while offline in which communication with an external communication apparatus, for example, the server 8 via the communication interface 63 is disconnected, has reached the number of printable sheets while offline. Specifically, the controller 61 reads the number of printable sheets while offline from the number-of-sheets storage portion 629 of the apparatus memory 62. Then, the controller 61 reads a count value of the second number-of-sheets counter stored in the area 626 of the apparatus memory 62 from the time point when the offline is detected, and determines whether the condition B1 is satisfied.

Condition B2 is a case where a print stop instruction has been received from the server 8 via the communication interface 63. For example, the controller 61 receives the print stop instruction from the server 8 via the communication interface 63, when the user has not paid the usage fee even after the payment deadline for the usage fee of the apparatus contract or consumable contract has passed.

Condition B3 is a case where the end of the contract period of the "apparatus contract" or the "consumable contract" has been detected with the timer 69 as an internal clock. The controller 61 reads information of the contract end date and time for each of the "apparatus contract" and the "consumable contract" from the period storage portion 630 of the apparatus memory 62, and determines whether the condition B3 is satisfied.

In response to determining that none of the restriction conditions B of the restriction mode setting table 95 is satisfied (S26: NO), the controller 61 execute the processing of S22 again. In response to determining that any of the restriction conditions B of the restriction mode setting table 95 is satisfied (S26: YES), the controller 61 stores the satisfied condition of the restriction conditions B in the apparatus memory 62, and then proceeds to processing of S27.

In S27, the controller 61 acquires the restriction mode based on the first type information and the restriction condition satisfied in S26. Specifically, first, the controller 61 reads the first type information from the area 624 of the apparatus memory 62. In a case where the first type information indicates "contract apparatus", the controller 61 determines that the "apparatus contract" has been set. Then, the controller 61 reads the restriction mode based on a combination with any of the conditions B1, B2, and B3 satisfied in S26, and stores the restriction mode in the apparatus memory 62 (S27).

For example, if the combination of "apparatus contract is set" and "condition B1" applies, the controller 61 reads the restriction mode of restriction 1 (level 1) in S27. In a case where a plurality of conditions out of condition B1, condition B2, and condition B3 are satisfied, the controller 61 reads the restriction mode of the higher (or highest) level among "restriction 1 (level 1)", "restriction 3 (level 2)", or "restriction 5 (level 3)". Then, the controller 61 stores the read restriction mode in the apparatus memory 62 (S27).

In a case where the first type information indicates the "normal apparatus", the controller 61 determines that the "apparatus contract" is not set. Then, the controller 61 reads the restriction mode based on a combination with any of the conditions B1, B2, and B3 satisfied in S26, and stores the restriction mode in the apparatus memory 62 (S27).

For example, in a case where the combination of "apparatus contract is not set" and "condition B1" applies, the controller 61 reads the restriction mode of restriction 2 (level 1) in S27. In a case where a plurality of conditions out of condition B1, condition B2, and condition B3 are satisfied, the controller 61 reads the restriction mode of the higher (or highest) level among "restriction 2 (level 1)", "restriction 4 (level 2)", or "restriction 6 (Level 3)". Then, the controller 61 stores the read restriction mode in the apparatus memory 62 (S27).

In S28, the controller 61 reads the restriction mode stored in S27 from the apparatus memory 62, and sets the restriction mode of the restriction content setting table 96 shown in FIG. 10. As shown in FIG. 10, the restriction content setting table 96 includes information of "restriction mode", "usable toner cartridge", "scanner function", "fax transmission function", "fax reception function (print)" and "fax reception function (memory reception)" representing the functions of the MFP 1.

The "restriction mode" includes information of the restriction modes of restriction 1, restriction 2, restriction 3, restriction 4, restriction 5, and restriction 6. The "usable toner cartridge" includes the restriction content information "none" corresponding to restriction 1, restriction 3, and restriction 5, and includes the restriction content information "normal cartridge" corresponding to restriction 2, restriction 4, and restriction 6. The "scan function" includes the restriction content information "usable" corresponding to restriction 1, restriction 2, restriction 4, and restriction 6, and includes the restriction content information "not usable" corresponding to restriction 3 and restriction 5.

The "fax transmission function" includes the restriction content information "usable" corresponding to restrictions 1, 2, 4, and 6, and includes restriction content information "not usable" corresponding to restrictions 3 and 5. The "fax reception function (print)" includes the restriction content information "not usable" corresponding to restrictions 1, 3, and 5, and includes the restriction content information "usable (with normal cartridge)" corresponding to restrictions 2, 4, and 6.

The "fax reception function (memory reception)" includes the restriction content information "not usable" corresponding to restriction 1, and includes the restriction content information "usable" corresponding to restrictions 2, 4, and 6. The "fax reception function (memory reception)" includes the restriction content information "usable (panel display guide)" corresponding to restriction 3, and includes the restriction content information "not usable (forced TEL mode)" corresponding to restriction 5.

Thus, at least part of the "fax transmission function", "fax reception function (print)", and "fax reception function (memory reception)" is switched from "usable" to "not usable" depending on each of the restrictions 1 to 6. Alternatively, all of the "fax transmission function", "fax reception function (print)", and "fax reception function (memory reception)" corresponding to restrictions 1, 3, and 5 may be switched from "usable" to "not usable".

The restriction content information "usable toner cartridge", "scanner function", "fax transmission function", "fax reception function (print)", and "fax reception function (memory reception)" representing the functions of the MFP 1 will be described in more detail below.

The "usable toner cartridge" in the restriction content setting table 96 indicates "print function" that is usable in the print engine 66, and indicates the type of the toner cartridge 4 that is usable for printing among the two types of toner cartridges of a contract cartridge and a normal cartridge. For example, in a case where the "usable toner cartridge" is "none", it means that neither the contract cartridge nor the normal cartridge can be used for printing. In other words, it means that the "print function" that is usable in the print engine 66 is stopped.

In a case where the "usable toner cartridge" is the "normal cartridge", it means that only the toner cartridge 4 of the normal cartridge is usable for printing. In other words, when the toner cartridge 4 of the contract cartridge is attached to the apparatus main body 10, the "print function" that is usable in the print engine 66 is stopped (prohibited).

For example, in a case where the "scanner function" in the restriction content setting table 96 is "usable", it means that the "scanner function" that is usable by the scanner 67 is not restricted. In other words, it means that the MFP 1 is allowed to use the "scanner function" of the scanner 67. In a case where the "scanner function" in the restriction content setting table 96 is "not usable", it means that the "scanner function" that is usable in the scanner 67 is stopped. In other words, it means that the MFP 1 stops the "scanner function" by the scanner 67.

For example, in a case where the "fax transmission function" in the restriction content setting table 96 is "usable", it means that the fax transmission function via the facsimile and telephone communication interface 68 is usable. In a case where the "fax transmission function" in the restriction content setting table 96 is "not usable", it means that the fax transmission function via the facsimile and telephone communication interface 68 is stopped. In other words, it means that the MFP 1 stops the "fax transmission function" that is usable by the facsimile and telephone communication interface 68.

For example, in a case where the "fax reception function (print)" in the restriction content setting table 96 is "not usable", it means that printing output of image data received by facsimile via the communication interface 63 is stopped. In a case where the "fax reception function (print)" in the restriction content setting table 96 is "usable (with normal cartridge)", it means that image data received by fax is printed out when the toner cartridge 4 of the normal cartridge is attached. In other words, it means that, when the toner cartridge 4 of the contract cartridge is attached, the "facsimile reception function" for printing out image data received by facsimile is stopped.

For example, in a case where the "fax reception function (memory reception)" in the restriction content setting table 96 is "usable", it means that image data received by fax is stored and saved in the apparatus memory 62. In a case where the "fax reception function (memory reception)" in the restriction content setting table 96 is "not usable", it means that setting (restriction) is made to stop storing image data received by fax via the communication interface 63 in the apparatus memory 62.

In a case where the "fax reception function (memory reception)" in the restriction content setting table 96 is "usable (panel display guide)", it means that it is displayed on the display 64 that image data received by fax is stored in the apparatus memory 62. In a case where the "fax reception function (memory reception)" in the restriction content setting table 96 is "not usable (forced TEL mode)", it means that, when a fax is received via the communication interface 63, the facsimile and telephone communication interface 68 performs voice communication. In other words, it means that the storage of image data received by facsimile in the apparatus memory 62 is stopped (prohibited).

Then, the controller 61 sets the restriction content for each function "usable toner cartridge", "scanner function", "fax transmission function", "fax reception function (print)", and "fax reception function (memory reception)" corresponding to the restriction mode. That is, the controller 61 switches each function to the restriction content corresponding to this restriction mode (S28).

Thus, in S28, for example, when the controller 61 reads out the restriction mode of "restriction 3" stored in S27 from the apparatus memory 62, this "restriction 3" in the restriction content setting table 96 shown in FIG. 10 is set. As shown in FIG. 10, since the "usable toner cartridge" corresponding to "restriction 3" is "none", the controller 61 sets (restricts) to stop the "print function" that is usable in the print engine 66.

Since the "scanner function" corresponding to "restriction 3" is "not usable", the controller 61 sets (restricts) to stop the "scanner function" that is usable in the scanner 67. Further, since the "fax transmission function" corresponding to "restriction 3" is "not usable", the controller 61 sets (restricts) to stop the fax transmission function via the facsimile and telephone communication interface 68.

Further, since the "fax reception function (print)" corresponding to the "restriction 3" is "not usable", the controller 61 sets (restricts) to stop printing out image data received by fax via the communication interface 63. Further, since the "fax reception function (memory reception)" corresponding to "restriction 3" is "usable (panel display guide)", the controller 61 sets to store and save image data received by fax in the apparatus memory 62.

When image data is stored in the apparatus memory 62, the controller 61 displays on the display 64 that the image data received by facsimile is stored in the apparatus memory 62. This enables the user to receive fax-received image data such as a message from the MFP 1 by the user terminal 9 and check the received image data.

In a case where the "print function" that is usable in the print engine 66 is restricted in S28, in S29 the controller 61 displays the content of the restricted "print function" on the display 64 to notify the user. In a case where the "scanner function" that is usable in the scanner 67 is restricted (stopped) in S28, the controller 61 displays on the display 64 that the "scanner function" has been restricted (stopped) to notify the user.

In a case where the "fax transmission function" that is usable by the facsimile and telephone communication interface 68 is restricted (stopped) in S28, the controller 61 displays on the display 64 that the "fax transmission function" has been restricted (stopped) to notify the user. In a case where the "facsimile reception function" that is usable by the facsimile and telephone communication interface 68 is restricted (stopped and so on) in S28, the controller 61 displays on the display 64 that the "facsimile reception function" has been restricted (stopped and so on) to notify the user (S29).

Thereafter, in S30, the controller 61 reads out the satisfied restriction condition B stored in the apparatus memory 62 in S26, and determines whether the satisfied restriction condition B has been canceled. For example, in a case where the restriction condition B satisfied in S26 is the condition B1, the controller 61 determines whether communication with an external communication apparatus such as the server 8 via the communication interface 63 has been established. In response to determining that communication with an external communication apparatus such as the server 8 via the communication interface 63 has been established, the controller 61 determines that the restriction condition B satisfied in S26 has been canceled.

For example, in a case where the restriction condition B satisfied in S26 is the condition B2, the controller 61 determines whether the user has paid the usage fee and has received a print restart instruction from the server 8 via the communication interface 63. In response to determining that the print restart instruction has been received from the server 8 via the communication interface 63, the controller 61 determines that the restriction condition B satisfied in S26 has been canceled.

For example, in a case where the restriction condition B satisfied in S26 is the condition B3, the controller 61 determines whether a notification that "apparatus contract" and "consumable contract" have been set or a notification that "consumable contract" has been set has been received from the server 8 via the communication interface 63. In response to determining that a notification that "apparatus contract" and "consumable contract" have been set or a notification that "consumable contract" has been set has been received from the server 8 via the communication interface 63, the controller 61 determines that the restriction condition B satisfied in S26 has been canceled.

In response to determining that the restriction condition B satisfied in S26 has not been canceled (S30: NO), the controller 61 executes the processing of S30 again. In response to determining that the restriction condition B satisfied in S26 has been canceled (S30: YES), the controller 61 proceeds to the processing of S31.

In S31, the controller 61 cancels the restriction set on the "print function" that is usable by the print engine 66 set in S28. This enables the user to perform printing by using the toner cartridge 4 of the contract cartridge and the normal cartridge. Further, the controller 61 cancels the restriction set in the "scanner function" that is usable by the scanner 67 set in S28. This enables the user to obtain image data of a scan target to be read by the scanner 67.

The controller 61 also cancels the restriction set in S28 on each of the "fax transmission function" and the "fax reception function" that is usable by the facsimile and telephone communication interface 68. This enables the user to transmit and receive faxes to and from the outside. After that, the controller 61 executes the processing of S22 and thereafter again.

According to one aspect of this disclosure, the controller switches the function that is usable in the image forming apparatus, based on a combination of the first type information determined in the first determination process and the second type information determined in the second determination process. Thus, the usable function is changed depending on whether the apparatus main body of the image forming apparatus is a contract apparatus that is usable when the apparatus contract is set, or whether the consumable attached to the apparatus main body is a contract consumable that is usable when the apparatus contract is set. In other words, the usable function of the image forming apparatus is changed depending on whether a contract for the image forming apparatus and consumable is set.

According to one aspect of this disclosure, since the second determination process is executed after the first determination process, the controller reliably determines whether the apparatus contract for the image forming apparatus is set.

According to one aspect of this disclosure, the apparatus memory stores the switch condition set for switching the function that is usable in the image forming apparatus according to the first type information or the second type information. Thus, the controller determines whether the switch condition set for switching the function that is usable in the image forming apparatus is satisfied.

According to one aspect of this disclosure, in a state where the consumable contract for the image forming apparatus is set, the controller determines whether the switch condition set for switching the function that is usable in the image forming apparatus is satisfied. Thus, it is determined whether the switch condition is satisfied only when the consumable contract for the image forming apparatus is set.

According to one aspect of this disclosure, the controller executes the switching process in response to determining that the switch condition is satisfied. Thus, the controller changes the function that is usable in the image forming apparatus in a case where it is determined that the switch condition is satisfied.

According to one aspect of this disclosure, the switching process includes the process of restricting the function that is usable in the image forming apparatus. Thus, the controller restricts the usable function depending on whether the apparatus contract for the image forming apparatus is set.

According to one aspect of this disclosure, the controller switches and changes the print function that is usable in the print engine depending on whether the apparatus contract for the image forming apparatus is set.

According to one aspect of this disclosure, the controller switches and changes the scanner function that is usable in the scanner depending on whether the apparatus contract for the image forming apparatus is set.

According to one aspect of this disclosure, the controller switches and changes at least part of the fax transmission function or the fax reception function performed via the communication interface, depending on whether the apparatus contract for the image forming apparatus is set.

According to one aspect of this disclosure, the switch condition includes that the number of printed sheets while offline reaches the number of printable sheets while offline. Thus, when the number of printed sheets while offline reaches the number of printable sheets while offline, the controller switches to stop the print function depending on whether the apparatus contract for the image forming apparatus is set.

According to one aspect of this disclosure, the switch condition includes that a print stop instruction is received from an external communication apparatus via the communication interface. Thus, in response to receiving the print stop instruction from the external communication apparatus via the communication interface, the controller switches to stop the print function depending on whether the apparatus contract for the image forming apparatus is set.

According to one aspect of this disclosure, the switch condition includes that the timer detects the contract period end of the consumable contract or the apparatus contract. Thus, when the timer detects the contract period end of the consumable contract or the apparatus contract, the usable function is changed depending on whether the apparatus contract for the image forming apparatus is set.

According to one aspect of this disclosure, in response to determining that the first type information indicates the contract apparatus and determining that the switch condition is satisfied, the controller sets the print function of the print engine to an unusable state. Thus, in a case where the ownership of the image forming apparatus belongs to the business operator, when the switch condition is satisfied, the controller stops the print function using the contract consumable and the normal consumable.

According to one aspect of this disclosure, in response to determining that the first type information indicates the normal apparatus, determining that the second type information indicates the contract consumable, and determining that the switch condition is satisfied, the controller sets the print function of the print engine to an unusable state. Thus, in a case where the ownership of the image forming apparatus belongs to the user, when the switch condition is satisfied, the controller stops the print function using the contract consumable.

According to one aspect of this disclosure, in response to determining that the first type information indicates the normal apparatus, determining that the second type information indicates the normal consumable, and determining that the switch condition is satisfied, the controller sets the print function of the print engine to a usable state. Thus, in a case where the ownership of the image forming apparatus belongs to the user, when the switch condition is satisfied, the controller sets the print function using the normal consumable to be usable continuously.

According to one aspect of this disclosure, in response to determining that the advance notice condition is satisfied in a state where the consumable contract is set, the controller outputs the advance notice that there is a possibility that the function usable in the image forming apparatus is switched depending on whether the apparatus contract for the image forming apparatus is set. This allows the user to confirm that there is a possibility that the usable function of the image forming apparatus is switched, and avoid switching of the usable function of the image forming apparatus.

According to one aspect of this disclosure, when the switch condition for switching the function of the image forming apparatus is canceled, the controller returns the function usable in the image forming apparatus to the function usable in the image forming apparatus before switching the function. This allows the user to use the image forming apparatus as usual.

According to one aspect of this disclosure, in response to receiving a notification that the apparatus contract is set from an external communication apparatus via the communication interface, the controller stores, in the apparatus memory, the first type information indicating the contract apparatus. Thus, by sending a notification that the apparatus contract is set to the image forming apparatus from the external communication apparatus via the communication interface in a warehouse of a sales company and so on, a setting is made such that the ownership of the image forming apparatus belongs to the business operator. This enables to set in advance such that the ownership of the image forming apparatus belongs to the user at the time of shipment from the factory, thereby allowing standardization of products in stock in the warehouse of the sales company, and so on.

According to one aspect of this disclosure, in response to receiving a notification that the consumable contract is set from an external communication apparatus via the communication interface, the controller stores, in the apparatus memory, the contract information indicating a state where the consumable contract for the image forming apparatus is set. Thus, by sending a notification that the consumable contract is set to the image forming apparatus from the external communication apparatus via the communication interface in a warehouse of a sales company and so on, the contract information is set to a state where the consumable contract is set. Thus, the contract information is set in advance to a state where the consumable contract is not set, at the time of shipment from the factory, thereby allowing standardization of products in stock in the warehouse of the sales company, and so on.

MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not restriction the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

MODIFICATION 1

For example, "restriction 1", "restriction 2", "restriction 3", "restriction 4", "restriction 5" and "restriction 6" stored in the restriction mode setting table 95 shown in FIG. 9 may not have a selection order for selecting one from two or more "restriction modes". That is, "level 1", "level 2", and "level 3" indicating the selection order for selecting one from two or more "restriction modes" may not be added to each of the restriction modes "restriction 1", "restriction 2", "restriction 3", "restriction 4", "restriction 5" and "restriction 6".

And, "level 1", "level 2", "level 3", "level 4" and so on indicating the selection order for selecting "restriction content" may be added to each of the restriction contents of the plurality of functions of the MFP 1 corresponding to each restriction mode stored in the restriction content setting table 96 shown in FIG. 10. The "level 1", "level 2", "level 3", "level 4", and so on indicate a selection order for selecting one "restriction content" from two or more "restriction contents" of each function corresponding to each restriction mode, when two or more restriction modes are selected. The selection order for selecting the "restriction contents" may become higher in order of "level 1", "level 2", "level 3", "level 4", and so on (the "level 1" is the lowest level, for example).

In S27, in a case where a plurality of conditions among the conditions B1, B2, and B3 are satisfied, the controller 61 may read the corresponding plurality of restriction modes and store the same in the apparatus memory 62.

In S28, the controller 61 reads the plurality of restriction modes stored in S27 from the apparatus memory 62, and sets the restriction modes of the restriction content setting table 96 shown in FIG. 10. Then, the restriction content of the highest level among "level 1", "level 2", "level 3", "level 4", and so on added to two or more "restriction contents" of each function corresponding to each restriction mode may be set as the restriction content of each function by the controller 61.

MODIFICATION 2

The image forming apparatus of the present disclosure is not limited to the MFP 1. The image forming apparatus may be an apparatus having a single function (for example, a print function), such as a laser printer or an inkjet printer.

MODIFICATION 3

The drum cartridge 20 may have a photosensitive drum, a cartridge housing, the drum memory 22, a charger, and a development roller. The photosensitive drum, the drum memory 22, the charger and the development roller are provided at the cartridge housing. The toner cartridge 4 includes a cartridge housing and the toner memory 42, but does not include a development roller. The cartridge housing contains toner. The outer circumferential surface of the development roller contacts the outer circumferential surface of the photosensitive drum inside the drum cartridge 20.

MODIFICATION 4

The toner cartridge 4 may include two cartridges (not shown). A first cartridge of the two cartridges constituting the toner cartridge 4 includes a development roller. A second cartridge of the two cartridges constituting the toner cartridge 4 includes a cartridge housing and the toner memory 42. The cartridge housing contains toner.

MODIFICATION 5

The MFP 1 may include one cartridge (not shown) instead of the drum cartridge 20 and the toner cartridge 4. The one cartridge includes a photosensitive drum, a cartridge housing, a memory, a charger, and a development roller. The outer circumferential surface of the development roller contacts the outer circumferential surface of the photosensitive drum inside the one cartridge. The cartridge housing of the one cartridge contains toner.

MODIFICATION 6

In the MFP 1, the drum cartridge 20 and the toner cartridge 4 may be detachable from the apparatus main body 10 independently from each other.

MODIFICATION 7

The print engine 66 of the MFP 1 may be of an inkjet printer type. In a case where the print engine 66 is of the inkjet printer type, an ink cartridge instead of the drum cartridge 20 and the toner cartridge 4 is attached to the apparatus main body 10 of the MFP 1. The number of ink cartridges to be attached to the MFP 1 is not particularly limited. For example, a total of four ink cartridges corresponding to the four colors of cyan, magenta, yellow, and black may be attached to the MFP 1, or an ink cartridge of one color of black may be attached to the MFP 1.

The ink cartridge includes an ink memory. The ink memory stores, for example, an ink ID, ink type information, an ink remaining amount, a new product flag, and ordered information. The ink ID is information similar to the toner ID. The ink type information is information similar to the second type information.

In the case where the print engine 66 is of the ink jet printer type, too, the flow of processing in FIGS. 4 and 5 is the same. Specifically, in the case where the print engine 66 is of the ink jet printer type, the "toner cartridge 4" and "toner memory 42" in the above-described embodiment may be changed into an ink cartridge and an ink memory, respectively. Further, "toner ID", "second type information", and "toner remaining amount information" may be changed into an ink ID, ink type information, and ink remaining amount information, respectively. In the case where the print engine 66 is of the ink jet printer type, too, the same effects as those of the MFP 1 of the above-described embodiment are obtained.

MODIFICATION 8

In S11 of FIG. 4 in the above-described embodiment, the controller 61 determines whether an instruction indicating that the "apparatus contract" and "consumable contract" have been set has been input via the operation interface 65. Alternatively, in S11 the controller 61 may determine whether an instruction indicating that the "apparatus contract" has been set has been input via the operation interface 65. In response to determining that an instruction indicating that the "apparatus contract" has been set has been input via the operation interface 65, the controller 61 may proceed to the processing of S12, and then determine whether an instruction indicating that the "consumable contract" has been set has been input via the operation interface 65.

MODIFICATION 9

The "necessary" and "unnecessary" in each cell in the switching determination table 91 in FIG. 6 are just an example. The "necessary" and "unnecessary" in each cell in the switching determination table 91 may be changed as appropriate, and the controller 61 may determine whether the switching determination is necessary or unnecessary based on whether the apparatus contract is set (the first type information), whether the type of the toner cartridge 4 is "contract cartridge" or "normal cartridge" (the second type information), and whether the consumable contract is set (the contract information).

EXAMPLE OF IMPLEMENTATION BY SOFTWARE

The functions of the MFP 1 (hereinafter referred to as "apparatus") may be realized by a program for causing a computer to function as the MFP 1, the program for causing the computer to function as the controller 61 of the MFP 1.

In this case, the MFP 1 includes a computer having at least one controller (for example, processor) and at least one storage device (for example, memory) as hardware for executing the above program. By executing the above program using the controller and the storage device, each function described in each of the above embodiments is realized.

The above program may be recorded on one or more non-transitory computer-readable recording medium (storage medium). This recording medium may or may not be included in the MFP 1. In the latter case, the above program may be supplied to the MFP 1 via any wired or wireless transmission medium.

A part or all of the functions of the controller 61 may be realized by a logic circuit. For example, an integrated circuit in which logic circuits functioning as the above control blocks are formed is also included in the scope of the present disclosure.

What is claimed is:

1. An image forming apparatus comprising:
an apparatus main body;
an apparatus memory configured to store first type information, the first type information indicating whether the apparatus main body is a contract apparatus or a normal apparatus, the contract apparatus being usable in a case where an apparatus contract for the image forming apparatus is set, the normal apparatus being usable regardless of whether the apparatus contract is set;
a consumable attached to the apparatus main body, the consumable including a consumable memory configured to store second type information, the second type information indicating whether the consumable is a contract consumable or a normal consumable, the contract consumable being usable in a case where a consumable contract for the image forming apparatus is set, the normal consumable being usable regardless of whether the consumable contract is set; and
a controller configured to:
determine whether the first type information indicates that the apparatus main body is the contract apparatus;
determine whether the second type information indicates that the consumable attached to the apparatus main body is the contract consumable; and
switch a function usable in the image forming apparatus based on a combination of the first type information and the second type information,
wherein the contract consumable and the normal consumable are unusable in a case where the apparatus contract for the image forming apparatus is set and the consumable contract for the image forming apparatus is set and a period for the apparatus contract ends, and
wherein the contract consumable is unusable and the normal consumable is usable in a case where the apparatus contract for the image forming apparatus is not set and the consumable contract for the image forming apparatus is set and a period for the consumable contract ends.

2. The image forming apparatus according to claim 1, wherein the controller is configured to, after determining whether the first type information indicates that the apparatus main body is the contract apparatus, determine whether the second type information indicates that the consumable attached to the apparatus main body is the contract consumable.

3. The image forming apparatus according to claim 1, wherein the apparatus memory is configured to store condition information indicating a switch condition, the switch condition being set for switching a function usable in the image forming apparatus depending on the first type information or the second type information.

4. The image forming apparatus according to claim 3, wherein the apparatus memory is configured to store contract information indicating whether the image forming apparatus is in a state where the consumable contract for the image forming apparatus is set; and
wherein the controller is configured to:
determine whether the contract information indicates the state where the consumable contract is set; and
in response to determining that the contract information indicates the state where the consumable contract is set, determine whether the switch condition is satisfied.

5. The image forming apparatus according to claim 4, wherein the controller is configured to, in response to determining that the switch condition is satisfied, switch the function usable in the image forming apparatus.

6. The image forming apparatus according to claim 5, further comprising a print engine having a print function,
wherein the controller is configured to:
in response to determining that the first type information indicates the contract apparatus and determining that the switch condition is satisfied, set the print function of the print engine to an unusable state.

7. The image forming apparatus according to claim 5, further comprising a print engine having a print function,
wherein the controller is configured to:
in response to determining that the first type information indicates the normal apparatus, determining that the second type information indicates the contract consumable, and determining that the switch condition is satisfied, set the print function of the print engine to an unusable state.

8. The image forming apparatus according to claim 7, wherein the controller is configured to:
in response to determining that the first type information indicates the normal apparatus, determining that the second type information indicates the normal consumable, and determining that the switch condition is satisfied, set the print function of the print engine to a usable state.

9. The image forming apparatus according to claim 5, further comprising a notification device configured to output information,
wherein the apparatus memory is configured to store advance notice condition information indicating an advance notice condition, the advance notice condition being set for outputting an advance notice that there is a possibility that the function usable in the image forming apparatus is switched based on the first type information or the second type information;
wherein the controller is configured to:
in response to determining that the contract information indicates a state where the consumable contract is set, determine whether the advance notice condition is satisfied; and
in response to determining that the advance notice condition is satisfied, output, via the notification device, the advance notice that there is a possibility that the function usable in the image forming apparatus is switched based on a combination of the first type information and the second type information.

10. The image forming apparatus according to claim 5, wherein the controller is configured to:
after switching the function usable in the image forming apparatus, determine whether the switch condition is satisfied; and
in response to determining that the switch condition is not satisfied, return the function usable in the image forming apparatus to the function usable in the image forming apparatus before switching the function.

11. The image forming apparatus according to claim 4, further comprising a communication interface,
wherein the controller is configured to:
in response to receiving a notification that the consumable contract is set from an external communication apparatus via the communication interface, store, in the apparatus memory, the contract information indicating a state where the consumable contract for the image forming apparatus is set.

12. The image forming apparatus according to claim 3, further comprising a communication interface,
wherein the apparatus memory includes a number-of-sheets storage portion configured to store a number of printable sheets while offline in which communication with an external communication apparatus via the communication interface is disconnected; and
wherein the switch condition includes that a number of printed sheets while offline reaches the number of printable sheets while offline.

13. The image forming apparatus according to claim 3, further comprising a communication interface,
wherein the switch condition includes that a print stop instruction is received from an external communication apparatus via the communication interface.

14. The image forming apparatus according to claim 3, wherein the controller includes a timer;
wherein the apparatus memory includes a period storage portion configured to store a contract period of each of the consumable contract and the apparatus contract, the contract period being from a contract start to a contract period end; and
wherein the switch condition includes that the timer detects the contract period end of the consumable contract or the apparatus contract.

15. The image forming apparatus according to claim 1, wherein the switching the function usable in the image forming apparatus includes restricting the function usable in the image forming apparatus.

16. The image forming apparatus according to claim 1, further comprising a print engine,
wherein the switching the function usable in the image forming apparatus includes switching a print function usable by the print engine.

17. The image forming apparatus according to claim 1, further comprising a scanner,
wherein the switching the function usable in the image forming apparatus includes switching a scanner function usable by the scanner.

18. The image forming apparatus according to claim 1, further comprising:
a communication interface; and
a facsimile interface configured to perform a facsimile transmission function via the communication interface and to perform a facsimile reception function via the communication interface,
wherein the switching the function usable in the image forming apparatus includes switching at least part of the facsimile transmission function or the facsimile reception function.

19. The image forming apparatus according to claim 1, further comprising a communication interface,
wherein the controller is configured to:
in response to receiving a notification that the apparatus contract is set from an external communication apparatus via the communication interface, store, in the apparatus memory, the first type information indicating the contract apparatus.

20. A control method of controlling an image forming apparatus, the image forming apparatus comprising: an apparatus main body; an apparatus memory configured to store first type information, the first type information indicating whether the apparatus main body is a contract apparatus or a normal apparatus, the contract apparatus being usable in a case where an apparatus contract for the image forming apparatus is set, the normal apparatus being usable regardless of whether the apparatus contract is set; and a consumable attached to the apparatus main body, the consumable including a consumable memory configured to store second type information, the second type information indicating whether the consumable is a contract consumable or a normal consumable, the contract consumable being usable in a case where a consumable contract for the image forming apparatus is set, the normal consumable being usable regardless of whether the consumable contract is set, the control method comprising:
determining whether the first type information indicates that the apparatus main body is the contract apparatus:
determining whether the second type information indicates that the consumable attached to the apparatus main body is the contract consumable; and
switching a function usable in the image forming apparatus based on a combination of the first type information and the second type information,
wherein the contract consumable and the normal consumable are unusable in a case where the apparatus contract for the image forming apparatus is set and the consumable contract for the image forming apparatus is set and a period for the apparatus contract ends, and
wherein the contract consumable is unusable and the normal consumable is usable in a case where the apparatus contract for the image forming apparatus is not set and the consumable contract for the image forming apparatus is set and a period for the consumable contract ends.

* * * * *